United States Patent
Hartlieb et al.

(10) Patent No.: US 11,598,656 B2
(45) Date of Patent: Mar. 7, 2023

(54) ENCODER FOR DETERMINING AN ANGULAR POSITION AND HAVING A PROTECTIVE CAP

(71) Applicant: SICK STEGMANN GmbH, Donaueschingen (DE)

(72) Inventors: Rolf Hartlieb, Villingen (DE); Jarrod Haupt, Minneapolis, MN (US)

(73) Assignee: SICK AG, Waldkirch (DE)

( * ) Notice: Subject to any disclaimer, the term of this patent is extended or adjusted under 35 U.S.C. 154(b) by 393 days.

(21) Appl. No.: 16/804,318

(22) Filed: Feb. 28, 2020

(65) Prior Publication Data
US 2020/0292359 A1    Sep. 17, 2020

(30) Foreign Application Priority Data
Mar. 12, 2019   (DE) .......................... 102019106288.8

(51) Int. Cl.
*G01B 7/30*    (2006.01)
*G01D 5/245*    (2006.01)
(Continued)

(52) U.S. Cl.
CPC ......... *G01D 5/2454* (2013.01); *F16C 41/007* (2013.01); *G01D 11/245* (2013.01)

(58) Field of Classification Search
CPC .......... G01D 5/145; G01D 5/147; G01D 5/12; G01D 5/14; G01D 5/16; G01D 5/26;
(Continued)

(56) References Cited

U.S. PATENT DOCUMENTS 4,380,928 A  *  4/1983  Iwasaki ................ G01D 5/2013
                                               324/207.16
5,969,518 A     10/1999  Merklein et al.
(Continued)

FOREIGN PATENT DOCUMENTS

DE    102016007722 A1    1/2017
EP        0146312 A2    6/1985
(Continued)

OTHER PUBLICATIONS

Incremental Encoder GEL 2010 Stainless steel 1.4305 Technical Information; Lenord + Bauer; 2010.
(Continued)

*Primary Examiner* — Thang X Le
(74) *Attorney, Agent, or Firm* — Nath, Goldberg & Meyer; Jerald L. Meyer

(57) ABSTRACT

An encoder (10) for determining an angular position, the encoder (10) comprising a shaft (14, 16), a housing (18) and a transition region (32), the shaft (14, 16) projecting outwards from the housing (18) into the transition region (32),
a measuring element (20) connected to the shaft (14),
a sensor (22) for detecting the measuring element (20),
and a control and evaluation unit (28) for generating, from the signals of the sensor (22), an angle signal in dependence on the angular position of the measuring element (20),
wherein a protective cap (34) is arranged in the transition region (32) for protection against fluids (12) directed with pressure onto the transition region (32).

18 Claims, 2 Drawing Sheets

Figure 1:
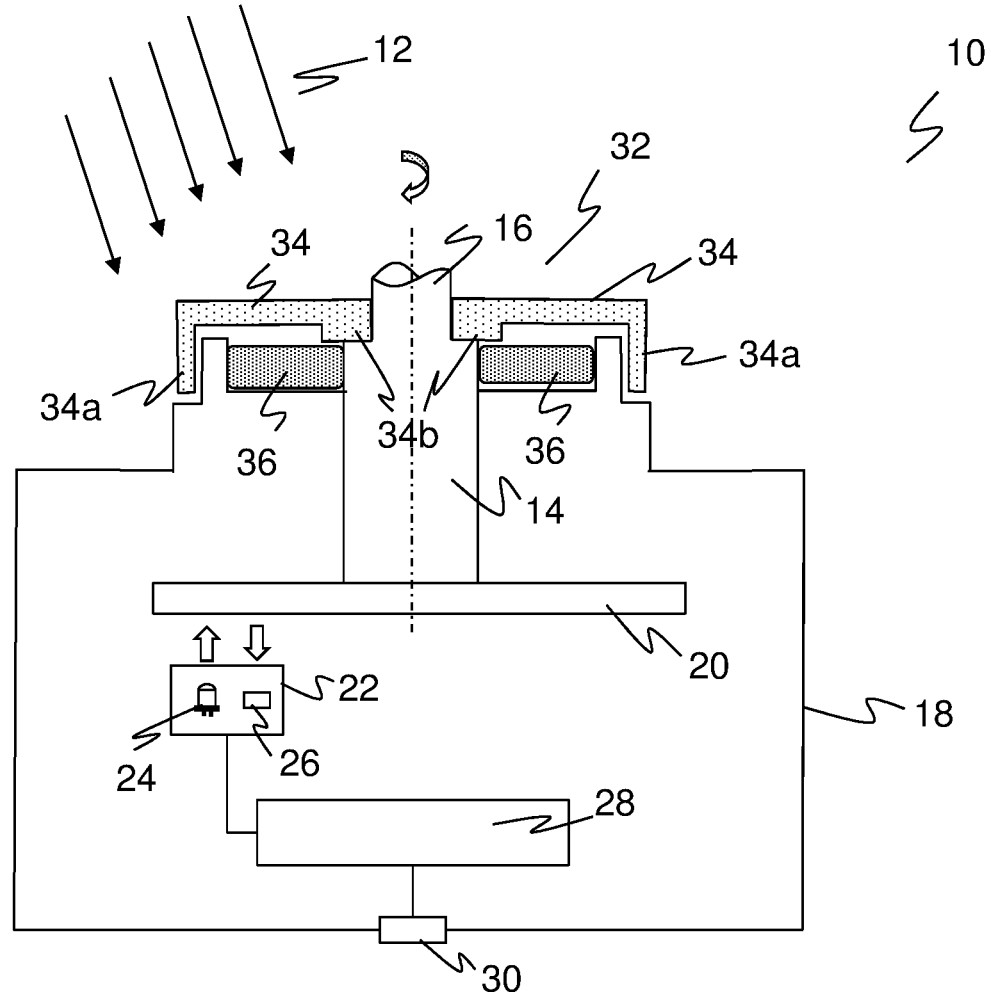

(51) Int. Cl.
*F16C 41/00* (2006.01)
*G01D 11/24* (2006.01)

(58) Field of Classification Search
CPC .... G01D 5/165; G01D 5/2454; G01D 5/2457;
G01D 5/2013; G01D 5/2046; G01D
5/24476; G01D 5/244; G01D 5/245;
G01D 11/245; G01R 33/025; G01R
33/07; G01R 33/0206; G01R 33/06;
G01R 33/063; G01R 33/09; G01R
33/093; G01R 33/0052; G01R 33/18;
F16C 41/007; G01N 27/9033; G01N
27/902; G01N 27/9013; G01N 27/904;
G01N 27/223; G01N 27/82; G01N
27/9093
See application file for complete search history.

(56) References Cited

U.S. PATENT DOCUMENTS

| | | | |
|---|---|---|---|
| 6,445,178 B1 * | 9/2002 | Hoekstra | G01D 18/001 |
| | | | 324/202 |
| 7,667,187 B2 | 2/2010 | Grigo et al. | |
| 8,400,144 B2 * | 3/2013 | Soyama | G01D 5/145 |
| | | | 324/207.25 |
| 2002/0125883 A1 | 9/2002 | Rutter et al. | |
| 2003/0173954 A1 * | 9/2003 | Terui | G01D 5/145 |
| | | | 324/207.21 |
| 2014/0077922 A1 * | 3/2014 | Horiguchi | G01D 5/145 |
| | | | 338/12 |
| 2015/0236570 A1 * | 8/2015 | Hayashi | H02K 11/30 |
| | | | 310/71 |
| 2017/0059369 A1 | 3/2017 | Ootake et al. | |
| 2017/0373373 A1 | 12/2017 | Tsuchida et al. | |
| 2018/0306607 A1 | 10/2018 | Wang et al. | |
| 2019/0363608 A1 * | 11/2019 | Haun | F16D 1/06 |

FOREIGN PATENT DOCUMENTS

| | | | |
|---|---|---|---|
| EP | 0146312 | A3 | 6/1985 |
| EP | 1452835 | A1 | 9/2004 |
| EP | 1452836 | A1 | 9/2004 |
| WO | 2016207125 | A2 | 12/2016 |
| WO | 2018219454 | A1 | 12/2018 |

OTHER PUBLICATIONS

German Search Report dated Nov. 8, 2019 corresponding to application No. 102019106288.8.

* cited by examiner

ENCODER FOR DETERMINING AN ANGULAR POSITION AND HAVING A PROTECTIVE CAP

The invention relates to an encoder for determining an angular position, the encoder having a protective cap against fluids directed with pressure onto the encoder.

Encoders or rotary encoders are used to detect an angular position, for example of a shaft. A measuring element or scale is detected, which is usually attached to the shaft whose angular position is to be determined so that it rotates with the shaft. The measuring element generates an intensity modulation during the relative movement, which is used as an angle signal.

Encoders are known with different sensor principles. Optical encoders use a code disk that modulates the signal of a light transmitter so that a light receiver arranged in transmission or reflection receives an angle signal. Another variant of an optical encoder is a polarization encoder. In a magnetic encoder, the rotary motion of a permanent magnet or its magnetic field is detected by a Hall sensor. More unusual sensors are also conceivable, such as a magneto-optical sensor that uses the Faraday effect to generate visibility of the magnetic flux density or the magnetic field, thus determining the angular position of a magnet that rotates with the shaft.

In hygienic applications, in particular in the food and beverage industry, encoders are required to be highly stable and robust. Here, regular cleaning under high pressure takes place ("washdown"). For this purpose, ingress protection classes are defined according to an IPx9K standard. An encoder meeting these standards must withstand regular, e.g. daily cleaning at a water temperature of at least 80° C. at pressures of 80 bar to 100 bar. Chemicals can also be used, for example to dissolve grease. Conventional encoders in these applications therefore regularly fail after a few months.

Lenord+Bauer offers a magnetic incremental encoder labeled GEL 2010 that meets the IP67 protection class. A seal is provided on the shaft. However, such a seal is not sufficient to prevent the ingress of liquid during repeated cleaning under high temperature and high pressure. As soon as liquid enters past the seal, it will eventually come into contact with the electronics, and the encoder will no longer function.

EP 1 452 835 A1 describes an encoder comprising a roller bearing with two bearing rings and a seal. However, this seal is only intended to withstand the effects of the weather and is not resistant to the usual cleaning processes used in hygienic applications.

U.S. Pat. No. 5,969,518 A1 deals with a device for measuring rotational speed. A seal closes the side of a bearing for two rings rotating with respect to one another. This seal again only serves to protect against environmental influences and would not stop a directed stream of cleaning medium.

US 2002/0125883 A1 discloses a measuring device with a sensor for a rolling bearing. The sensor is mounted with a sealing shield. With the intended position of the sensor on the side of the code disk, however, this is not at all the critical point for sealing an encoder.

It is therefore an object of the invention to reduce the vulnerability of an encoder to external influences.

This object is satisfied by an encoder for determining an angular position, the encoder comprising a shaft, a housing and a transition region, the shaft projecting outwards from the housing into the transition region, a measuring element connected to the shaft, a sensor for detecting the measuring element, and a control and evaluation unit for generating, from the signals of the sensor, an angle signal in dependence on the angular position of the measuring element, wherein a protective cap is arranged in the transition region for protection against fluids directed with pressure onto the transition region.

The encoder comprises a shaft whose angular position is to be determined. The shaft protrudes from the sensor or its housing, and the area where the shaft protrudes from the encoder is called the transition area. A measurement element or measurement scale rotates with the shaft, and the measurement element in turn is detected by a sensor. The desired angular position is obtained by evaluating the sensor signals. The specific measuring principle is not important for the invention, i.e. the specific features of the measuring element and the sensor, which may be configured in accordance with any known sensor principle, some of which are mentioned as examples in the introduction.

The invention starts from the basic idea of additionally sealing the weak point of the encoder against a stream of cleaning medium, namely the transition area where the shaft protrudes from the encoder. A protective cap is arranged in the transition area. This protective cap stops a stream of cleaning medium or other fluids and media directed at the encoder with high pressure at the transition area. The fluid may still accumulate in the transition area, but the directed stream is interrupted. A fluid remaining on the encoder without pressure, such as a film of moisture, no longer enters the encoder, or at least simple additional prevention measures are possible.

The invention has the advantage that the encoder can withstand the harsh conditions of a cleaning process commonly used in the hygiene sector ("washdown") for a long time and without any functional failure. The encoder thus becomes a hygienic encoder ("washdown encoder"), and it is possible to maintain IPx9P ingress protection classes. The protective cap can be manufactured at extremely low cost and can be arranged at the transition area and adapted for different shaft diameters.

The protective cap preferably is made of pressure resistant material. Throughout this specification, the terms preferred or preferably refer to an advantageous, but completely optional feature. The protective cap has to withstand a cleaning stream of water or other cleaning medium at high pressure and high temperature. Metal, in particular stainless steel, and certain plastics are suitable for this purpose. A typical sealing material such as soft plastic, on the other hand, does not meet the requirements of the protective cap.

A seal preferably is arranged below the protective cap. Below means that the protective cap also protects the seal from the cleaning stream. The seal is therefore located between the protective cap and the other parts of the encoder. The seal is not exposed to the cleaning stream and does not have to absorb its pressure. A simple accumulation of liquid on the seal is of no consequence, because this can easily be kept away from the interior of the encoder by the seal.

The seal preferably is arranged around the shaft. For example, a ring-shaped seal is concentrically arranged around the shaft.

The protective cap preferably is arranged around the shaft. It forms kind of a ring in rough geometric description, but preferably has more structure, as described below.

The arrangement of seal and/or protective cap around the shaft covers all conceivable lateral ingress areas.

The protective cap preferably forms an extension of the shaft. In this embodiment, the protective cap is arranged on the shaft like a hat and encloses the part of the shaft protruding from the encoder. The central part of the protective cap acts as part of the shaft in order to adapt the protruding part of the shaft in length and/or diameter to the connection requirements of the encoder applications.

The protective cap preferably is arranged on the shaft in press fit. This means that the space between the protective cap and the shaft is at least almost sealed. Any remaining leaks would at best allow liquid to enter in a creeping process and thus without any pressure at all. A seal underneath the protective cap prevents further penetration into the interior of the sensor.

The protective cap preferably has a lateral projection on its outer circumference. The lateral projection preferably encloses a corresponding housing area of the encoder, which usually has a cylindrical housing. The lateral projection increases the contact area between the protective cap and the housing. Due to the protective cap, no liquid can directly enter the encoder. However, the lateral projection further extends the indirect path, and the pressure a liquid still may have when reaching a seal under the protective cap is further reduced.

The protective cap preferably has a lateral projection on its inner circumference. This projection is the geometric counterpart of the lateral projection on the outer circumference, now intended for the internal contact area with the shaft. This contact area is enlarged to provide improved sealing and pressure reduction.

The lateral projection preferably is shorter on the inside than on the outside. This makes better use of the larger area available on the outside. The lateral projections preferably point in a same direction, parallel to the shaft and towards the encoder.

The protective cap preferably has a shape of two concentric cylindrical surface sections with a circular ring as connecting base surface. This is an alternative description of the geometry with lateral inside and outside projection of the protective cap. The circular ring is the actual protective cap, the cylinder surface sections provide additional sealing and additional pressure protection at the contact areas to the housing and shaft, thus supporting the function.

Figure 2:
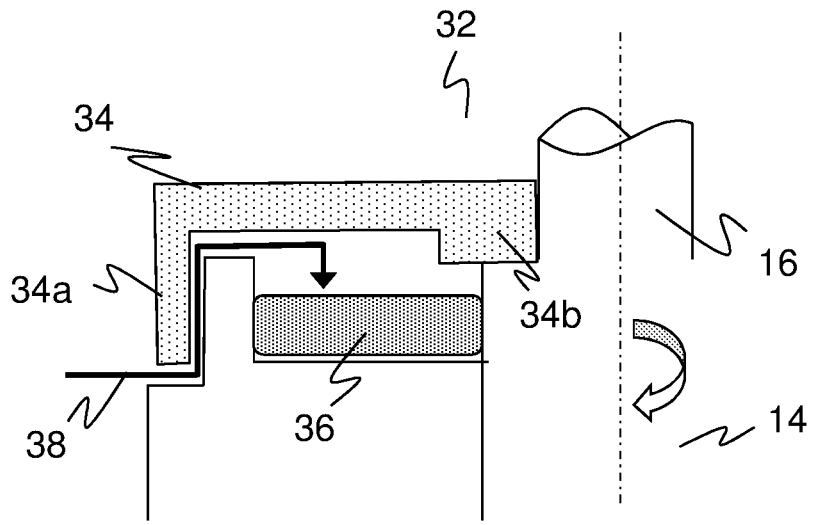
Figure 3:
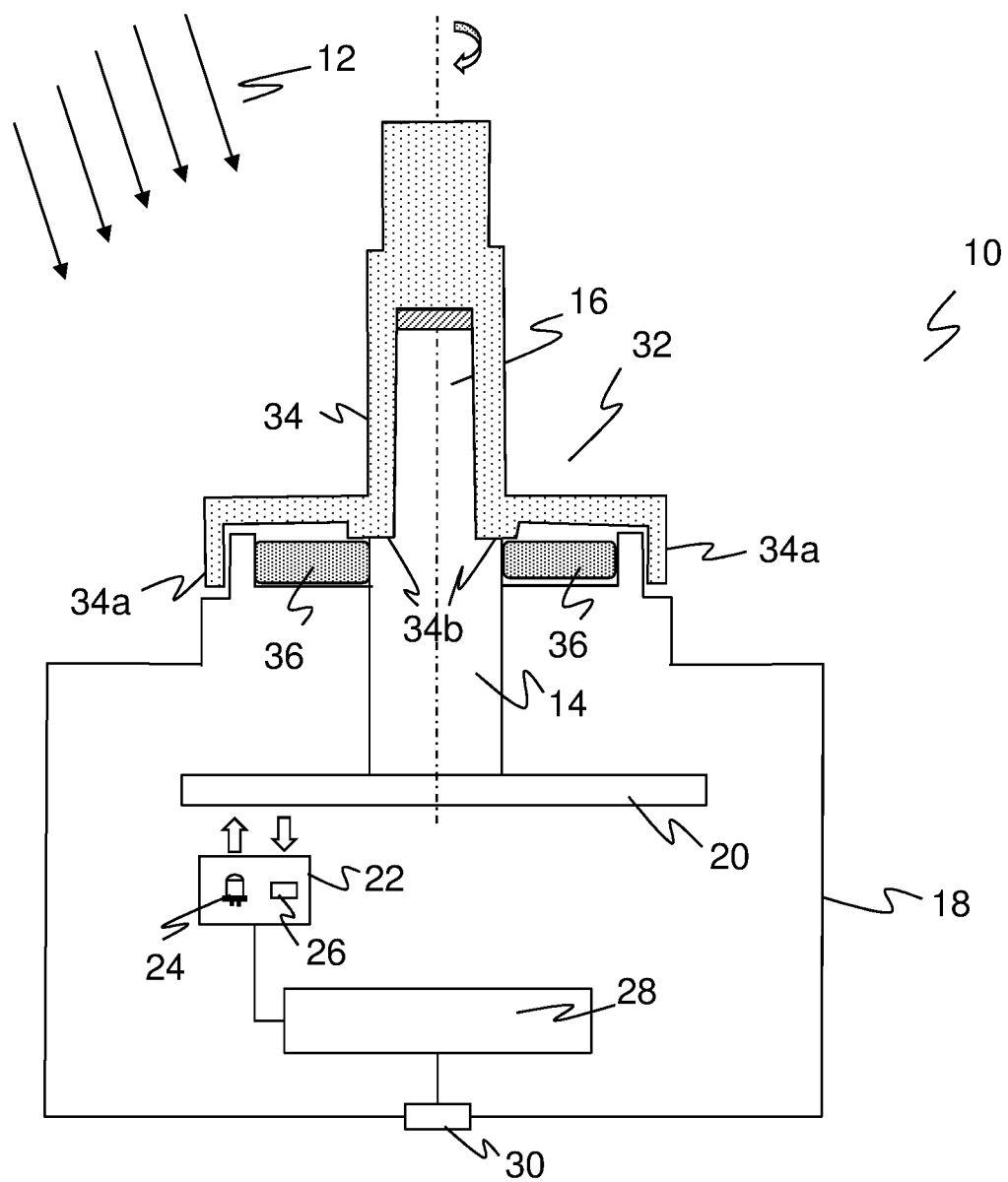

The invention will be explained in the following also with respect to further advantages and features with reference to exemplary embodiments and the enclosed drawing. The Figures of the drawing show in:

FIG. 1 a sectional view of an encoder having a protective cap in an exit area of a shaft;

FIG. 2 a partial view of the exit area to illustrate the path that cleaning fluid has to take cap in order to enter the encoder because of the protective; and FIG. 3 a sectional view of another embodiment of an encoder having a protective cap, the protective cap now acting as part of the shaft and adjusting the length and/or diameter of the shaft.

FIG. 1 shows a sectional view of an encoder 10 for hygienic applications ("washdown encoder"), for example in the food and beverage industry, which is resistant to even high pressure and high temperature streams of cleaning medium 12. The task of encoder 10 is to determine the respective angular position and/or speed of rotation of a shaft 14, whose upper part 16 protrudes from the typically cylindrical housing 18 of encoder 10. The diameter of the shaft 14 can taper abruptly towards the upper part 16 as shown, or alternatively the diameter could have a different course such as being constant.

In the shown embodiment as an optical encoder, the encoder 10 has a code disk 20 which rotates with the shaft 14. A sensor 22 having a light source 24 and a light receiver 26 detects the code disk 20 and generates corresponding sensor signals. A control and evaluation unit 28 calculates the desired angle signals from the sensor signals and makes them available at an output 30. The representation of the optical encoder is very schematic and limited to only a few functional blocks. The invention does not depend on any specific implementation of the angle measurement of the encoder 10. Thus, any sensor principles known per se for encoders are conceivable as an alternative, including the examples mentioned in the introduction. Absolute and incremental encoders are included, and the encoder 10 can have any interface and output format.

When used in hygienic applications, one challenge is that directed streams of cleaning medium 12 and comparable external influences must not cause penetration of the encoder 10 and thus damage of its electronics, not even in case of high pressure. Therefore, encoder 10 comprises a protective cap 34 in a transition area 32 where the upper part 16 of the shaft 14 protrudes from the housing 18.

The protective cap 34 is made of a durable, pressure-resistant material such as stainless steel, another metal or a correspondingly robust plastic. It is roughly annular and concentrically arranged around the shaft 14, 16. On the outside in the transition to the housing 18 as well as on the inside in the transition to the shaft 14, 16, the protective cap comprises a respective lateral projection 34a-b. This results in a geometry of the protective cap 34 having two concentric cylinder surface sections with a connecting, circular base. In view of FIG. 1, the circular base could also be called circular cover, since it is arranged on the top in FIG. 1. With the inner lateral projection 34b, the protective cap 34 is press fit to the shaft 14, 16, providing an additional sealing effect.

Preferably, an additional seal 36 is located below protective cap 34, which for example is configured as a concentric sealing ring around shaft 14. The seal 36 is intended to keep liquid out of the encoder 10 that still may have found its way through the protective cap 34.

FIG. 2 shows a partial view of the transition area 32 in order to illustrate the path 38 which any liquid that may still enter must take due to the effect of the protective cap 34 in order to reach the seal 36. It can clearly be seen that all direct paths are blocked by the protective cap 34. The potentially remaining path 38 with a plurality of shifts in direction underneath the protective cap 34 ensures that, at worst, liquid can accumulate on the seal 36 to a small extent and practically without pressure or at least with significantly reduced pressure. The seal 36 can seal the encoder 10 against such a liquid film.

With the embodiments of an encoder 10 as described, and due to the protective effect of the protective cap 34, a design according to protection class IPx9K can be achieved. In tests, the encoder 10 remains fully functional even after numerous cleaning cycles under high pressure and at high temperature and with the use of grease solvents between cleaning cycles.

FIG. 3 shows a sectional view of another embodiment of an encoder 10 having a protective cap 34. In the previous embodiments, the protective cap 34 has been ring-shaped, with a central opening where the shaft 14 or its upper part 16 protrudes from the encoder 10. Now, in the embodiment illustrated in FIG. 3, the protective cap 34 encloses the upper part of shaft 16 and forms a kind of hat with a central projection that functions as the upper part of the shaft. With that kind of protective cap 34, on the one hand, the inner contact area between protective cap 34 and shaft 14, 16 is completely sealed. In addition, the protective cap 34 makes it possible to easily create variants of the encoder 10 having different lengths and/or diameters of shafts.

The invention claimed is:

1. An encoder (10) for determining an angular position, the encoder (10) comprising:
   a shaft (14);
   a housing (18) and a transition region (32), an upper part (16) of the shaft (14) projecting outwards from the housing (18) into the transition region (32);
   a measuring element (20) connected to the shaft (14);
   a sensor (22) for detecting the measuring element (20); and
   a control and evaluation unit (28) for generating, from signals from the sensor (22), an angle signal in dependence on an angular position of the measuring element (20),
   wherein a protective cap (34) is arranged in the transition region (32) for protection against fluids (12) directed with pressure onto the transition region (32), and
   wherein the protective cap (34) completely covers the upper part (16) of the shaft (14), the protective cap (34) extending an axial length of the upper part (16) of the shaft (14).

2. The encoder (10) according to claim 1,
   wherein the protective cap (34) is made of pressure resistant material.

3. The encoder (10) according to claim 1,
   wherein a seal (36) is arranged below the protective cap (34).

4. The encoder (10) according to claim 3,
   wherein the seal (36) is arranged around the shaft (14).

5. The encoder (10) according to claim 1,
   wherein the protective cap (34) is arranged around the shaft (14).

6. The encoder (10) according to claim 1,
   wherein the protective cap (34) is arranged in press fit on the shaft (14).

7. The encoder (10) according to claim 1,
   wherein the protective cap (34) has a lateral projection (34a-b) on at least one of its outer circumference and its inner circumference.

8. The encoder (10) according to claim 7,
   wherein the lateral projection (34a-b) is shorter on the inside than on the outside.

9. The encoder (10) according to claim 1,
   wherein the protective cap (34) has a shape of two concentric cylindrical surface sections (34a-b) with a circular ring as connecting base surface.

10. An encoder (10) for determining an angular position, the encoder (10) comprising:
    a shaft (14);
    a housing (18) and a transition region (32), the shaft (14) projecting outwards from the housing (18) into the transition region (32);
    a measuring element (20) connected to the shaft (14);
    a sensor (22) for detecting the measuring element (20); and
    a control and evaluation unit (28) for generating, from signals from the sensor (22), an angle signal in dependence on an angular position of the measuring element (20),
    wherein a protective cap (34) is arranged in the transition region (32) for protection against fluids (12) directed with pressure onto the transition region (32), and
    wherein the protective cap (34) is arranged in press fit on the shaft (14) such that the protective cap (34) rotates with the shaft (14).

11. The encoder (10) according to claim 10,
    wherein the protective cap (34) is made of pressure resistant material.

12. The encoder (10) according to claim 10,
    wherein a seal (36) is arranged below the protective cap (34).

13. The encoder (10) according to claim 12,
    wherein the seal (36) is arranged around the shaft (14).

14. The encoder (10) according to claim 10,
    wherein the protective cap (34) is arranged around the shaft (14).

15. The encoder (10) according claim 10,
    wherein the protective cap (34) forms an extension of the shaft (14).

16. The encoder (10) according to claim 10,
    wherein the protective cap (34) has a lateral projection (34a-b) on at least one of its outer circumference and its inner circumference.

17. The encoder (10) according to claim 16,
    wherein the lateral projection (34a-b) is shorter on the inside than on the outside.

18. The encoder (10) according to claim 10,
    wherein the protective cap (34) has a shape of two concentric cylindrical surface sections (34a-b) with a circular ring as connecting base surface.

* * * * *